United States Patent
Yang et al.

(10) Patent No.: US 8,740,406 B2
(45) Date of Patent: Jun. 3, 2014

(54) METHOD AND APPARATUS FOR SOLID STATE ILLUMINATION

(75) Inventors: Yi Yang, Shen Zhen (CN); Yi Li, Pleasanton, CA (US); Fei Hu, Shen Zhen (CN)

(73) Assignee: Appotronics Corporation Limited, Shenzhen (CN)

( * ) Notice: Subject to any disclaimer, the term of this patent is extended or adjusted under 35 U.S.C. 154(b) by 35 days.

(21) Appl. No.: 13/594,162

(22) Filed: Aug. 24, 2012

(65) Prior Publication Data

US 2013/0050981 A1 Feb. 28, 2013

Related U.S. Application Data

(60) Provisional application No. 61/527,253, filed on Aug. 25, 2011.

(51) Int. Cl.
 *F21V 9/00* (2006.01)
 *G03B 21/20* (2006.01)
(52) U.S. Cl.
 CPC .................... *G03B 21/204* (2013.01)
 USPC ............... 362/231; 362/293; 353/84; 353/94
(58) Field of Classification Search
 CPC .................................................... H04N 7/3164
 USPC ............... 362/231, 293; 353/84, 94; 348/743
 See application file for complete search history.

(56) References Cited

U.S. PATENT DOCUMENTS

| | | | |
|---|---|---|---|
| 6,252,636 B1 * | 6/2001 | Bartlett .......................... | 348/743 |
| 7,530,697 B2 * | 5/2009 | Sawai et al. ..................... | 353/94 |
| 7,547,114 B2 * | 6/2009 | Li et al. .......................... | 362/231 |
| 8,469,520 B2 * | 6/2013 | Maeda ............................. | 353/31 |
| 8,474,997 B2 * | 7/2013 | Li et al. .......................... | 362/243 |
| 8,602,562 B2 * | 12/2013 | Miyamae ........................ | 353/20 |
| 2007/0121084 A1 * | 5/2007 | Chang ............................. | 353/94 |
| 2009/0009730 A1 * | 1/2009 | Destain .......................... | 353/84 |
| 2010/0283977 A1 * | 11/2010 | Wang et al. ..................... | 353/84 |

FOREIGN PATENT DOCUMENTS

| | | |
|---|---|---|
| CN | 101430491 | 5/2009 |
| CN | 101539270 | 9/2009 |
| CN | 101592308 | 12/2009 |
| CN | 101799583 | 8/2010 |
| JP | 2004-226613 | 8/2004 |

OTHER PUBLICATIONS

Chinese Office Action, dated Jan. 30, 2014, in a related Chinese patent application, No. CN 201110396276.2.

\* cited by examiner

*Primary Examiner* — Ali Alavi
(74) *Attorney, Agent, or Firm* — Chen Yoshimura LLP

(57) ABSTRACT

A light source includes two excitation light sources generating two respective excitation lights, a filter, and a wavelength conversion material. The second excitation light has a peak wavelength shorter than that of the first excitation light. The transmittance curves of the filter are dependent on the input angle. The first and second excitation lights are inputted to the filter at angles smaller than a first threshold angle, and angles between the first and a third threshold angle, respectively. Both excitation lights pass through the filter to excite the wavelength conversion material, which generates a converted light but reflects some of the excitation lights. Part of the reflected first excitation light reaches the filter at input angles greater than a second threshold angle and is reflected by the filter back to the wavelength conversion material for recycling. The third and second threshold angles are greater than the first threshold angle.

20 Claims, 6 Drawing Sheets

METHOD AND APPARATUS FOR SOLID STATE ILLUMINATION

This application claims priority under 35 USC §119(e) from U.S. Provisional Patent Application No. 61/527,253, filed Aug. 25, 2011, which is herein incorporated by reference in its entirety.

BACKGROUND OF THE INVENTION

1. Field of the Invention

This invention relates to solid state light sources that use wavelength conversion. More particularly, it relates to such solid state light sources with high brightness, useful in applications such as projectors.

2. Description of the Related Art

Conventional light source used in projectors is UHP lamp, where mercury plays an important role. More environmental-friendly technologies are desired. One type of solid state light source uses a wavelength conversion scheme to convert an excitation light into a converted light by a wavelength conversion material such as phosphors. U.S. Pat. No. 7,547,114 describes a light source structure, shown in FIG. 1 (adopted from FIG. 1 of the patent), where a solid-state light source 100 is used to provide an excitation light through a focusing system 102, and several color phosphors coated in different segments of a rotating phosphor wheel 104 are excited by the excitation light to generate a light having a color light sequence. In FIG. 1, A is the rotation axis of the color wheel 104.

When the excitation light is a narrow beam light, for example, when the excitation light beam has a divergence angle smaller than 45 degrees, a filter can be used to enhance the luminescent efficacy by recycling the reflected excitation light from the phosphor layer, as shown in FIG. 2. In this structure, the filter 22 (referred to as an angle selective filter) is designed to be transmissive when the excitation light has a small incident angle on the filter (input angle), and reflective when the excitation light has a large incident angle. The excitation light 24A is emitted from the light source 20, and transmitted through the filter 22 with a small incident angle (almost perpendicular to the filter) to illuminate the phosphor film 26. Some of the excitation light is absorbed by the phosphor and converted to luminescence light (converted light) 28A, but some of the excitation light 24B is reflected by the phosphor film 26 with a Lambertian distribution. Most of reflected light 24B, which has large incident angles, is reflected by the filter 22 and goes back into phosphor film 26 to generate a secondary luminescence light 28B. This enhances the recycling of the excitation light, which increases the luminescence efficiency of the entire device. There are many well-know method to convert the excitation lights into a narrow beam. For example, by using a collimation lens, a divergence beam can be converted to a beam with small divergence angle. In addition, there are light sources, such as lasers, that intrinsically generate narrow light beams. For example, blue laser often has a full beam divergence angle smaller than 50 degree. By using a collection lens, the beam divergence angle can be further reduced to less than 10 degree. The method mentioned above works particularly well for laser phosphor devices.

Increasing the excitation light power by coupling additional excitation light source, generally having the same color as the first excitation light source, is another way to enhance the luminescent brightness, as shown in FIG. 3. For example, a blue laser or blue laser array 30 can be used as the primary excitation light source to excite phosphors or other wavelength conversion materials like quantum dots, and a blue LED or LED array 20 can be added as the second excitation light source because of its lower cost compared to blue lasers. There are many methods for coupling the lights from the laser source 20 and the LED source 30. In the illustrated example, a small mirror 36 is used. Because the etendue of the LED source 30 is typically much larger than that of the laser 20, to maximize the LED power, a condenser lens 32 is used to collect and focus the LED light within the full hemisphere.

SUMMARY OF THE INVENTION

One difficulty with the structure shown in FIG. 3 is that, because of the use of the condenser lens 32, any filter at location 34 must transmit blue LED light having a large incident angle range, at least from 0 degree to 75 degree. This requirement cannot be accomplished with the angle selective filter 22 in FIG. 2, because the filter 22 would reflect large-angle light, and the blue LED light from the condenser 32 having large incident angle cannot pass through it. On the other hand, when an angle selective filter like filter 22 is not used at location 34, the reflected excitation light from the phosphor film 26 cannot be recycled.

The present invention is directed to a light source device, such as those useful in projector systems, and related method, which can incorporate the high luminescence efficiency for the narrow beam excitation light and combine the wide beam excitation light as additional excitation at the same time. The light source device utilizes a filter that is different from the angle selective filter 22 in FIG. 2.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a light source device which includes: a first excitation light source generating a first excitation light; a second excitation light source generating a second excitation light, wherein a peak wavelength of the second excitation light is shorter than a peak wavelength of the first excitation light; a filter, which substantially transmits the first excitation light at input angles smaller than a first threshold angle and substantially reflects the first excitation light at input angles greater than a second threshold angle, and which substantially transmits the second excitation light at input angles smaller than a third threshold angle, wherein the third and second threshold angles are greater than the first threshold angle; wherein the first excitation light source is arranged to input the first excitation light onto the filter at input angles smaller than the first threshold angle and passes through the filter, and the second excitation light source is arranged to input the second excitation light onto the filter at input angles smaller than a third threshold angle and at least partially greater than the first threshold angle and passes through the filter; and a wavelength conversion device carrying a wavelength conversion material, disposed to receive the first and second excitation lights that have passed through the filter, the wavelength conversion material converting a part of the first and second excitation lights into a converted light and reflecting another part of the first and second excitation lights toward the filter; and wherein the filter reflects a part of the first excitation light that has been reflected from the wavelength conversion material, and which reaches the filter at input angles greater than the second threshold angle, back toward the wavelength conversion material.

In another aspect, the present invention provides a light source device which includes: a first excitation light source generating a first excitation light; a second excitation light source generating a second excitation light, wherein a peak wavelength of the second excitation light is longer than a peak wavelength of the first excitation light; a filter, which substantially reflects the first excitation light at input angles smaller than a first threshold angle and substantially transmits the first excitation light at input angles greater than a second threshold angle, and which substantially transmits the second excitation light at input angles smaller than a third threshold angle, wherein the second threshold angle is greater than the first threshold angle; wherein the first excitation light source is arranged to input the first excitation light onto the filter at input angles greater than the second threshold angle and passes through the filter, and the second excitation light source is arranged to input the second excitation light onto the filter at input angles smaller than a third threshold angle and at least partially greater than the first threshold angle and passes through the filter; and a wavelength conversion device carrying a wavelength conversion material, disposed to receive the first and second excitation lights that have passed through the filter, the wavelength conversion material converting a part of the first and second excitation lights into a converted light and reflecting another part of the first and second excitation lights toward the filter; and wherein the filter reflects a part of the first excitation light that has been reflected from the wavelength conversion material, and which reaches the filter at input angles smaller than the first threshold angle, back toward the wavelength conversion material.

In another aspect, the present invention provides a light source device which includes: a first excitation light source generating a first excitation light; a second excitation light source generating a second excitation light, wherein a peak wavelength of the second excitation light is different from a peak wavelength of the first excitation light; a filter having transmittance characteristics that vary with an input angle of input light inputted on the filter, the filter being a low-pass or high-pass filter whose transition wavelengths vary with the input angles; wherein the first and second excitation light sources are arranged to input the first and second excitation lights onto the filter at different input angles, and wherein the filter substantially transmits each of the first and second excitation light; and a wavelength conversion device carrying a wavelength conversion material, disposed to receive the first and second excitation lights that have been transmitted through the filter, the wavelength conversion material converting a part of the first and second excitation lights into a converted light and reflecting another part of the first and second excitation lights toward the filter; and wherein the filter reflects a part of either the first or the second excitation light that has been reflected from the wavelength conversion material back toward the wavelength conversion material.

In another aspect, the present invention provides a light source device which includes: a first excitation light source generating a first excitation light; a second excitation light source generating a second excitation light, wherein a peak wavelength of the second excitation light is different from a peak wavelength of the first excitation light; a filter having transmittance characteristics that vary with an input angle of input light inputted on the filter, the filter being a low-pass or high-pass filter whose transition wavelengths vary with the input angles; wherein the first and second excitation light sources are arranged to input the first and second excitation lights onto the filter at different input angles, and wherein the filter substantially transmits each of the first and second excitation light; and a wavelength conversion device carrying a wavelength conversion material, disposed to receive the first and second excitation lights that have been transmitted through the filter, the wavelength conversion material converting a part of the first and second excitation lights into a converted light and reflecting another part of the first and second excitation lights toward the filter; and wherein the filter reflects a part of either the first or the second excitation light that has been reflected from the wavelength conversion material back toward the wavelength conversion material.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
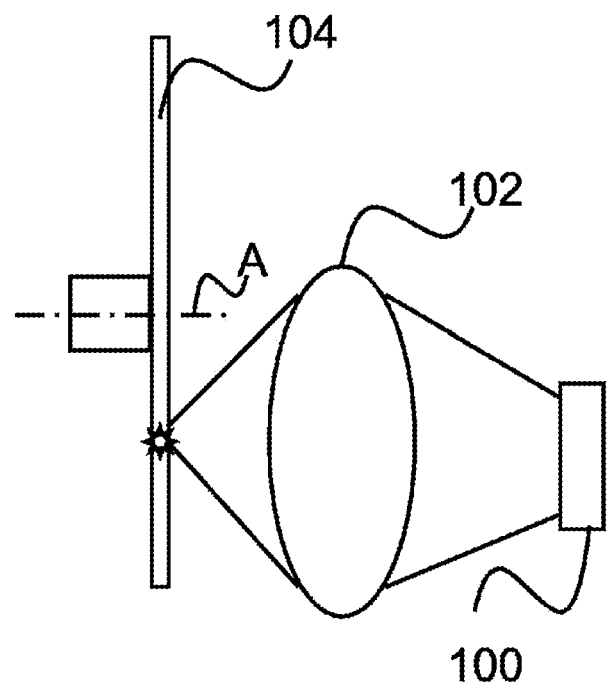
FIG. 1 shows a solid state light source device according to conventional art.
Figure 2:
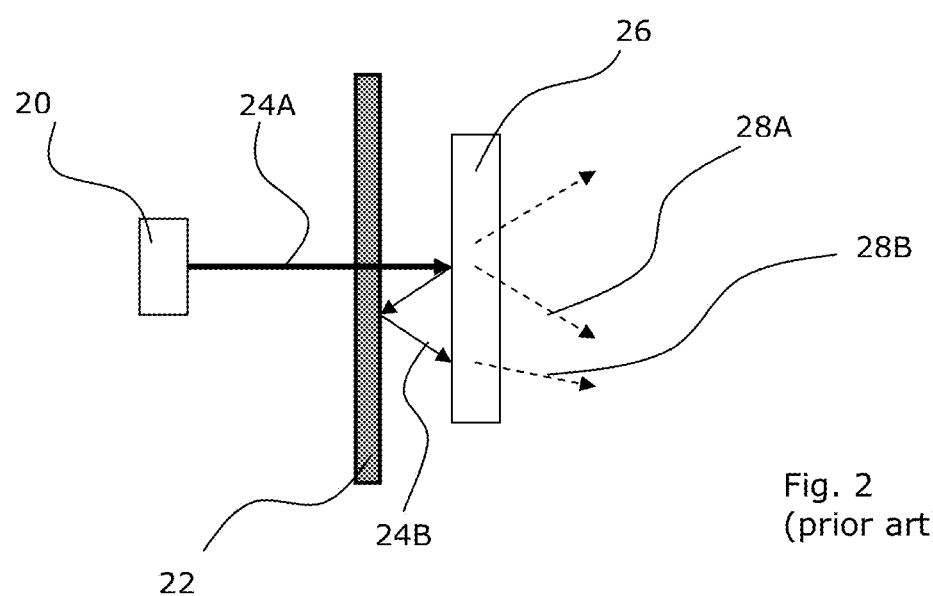
FIG. 2 shows a solid state light source device according to conventional art, which uses excitation light recycling to enhance brightness.
Figure 3:
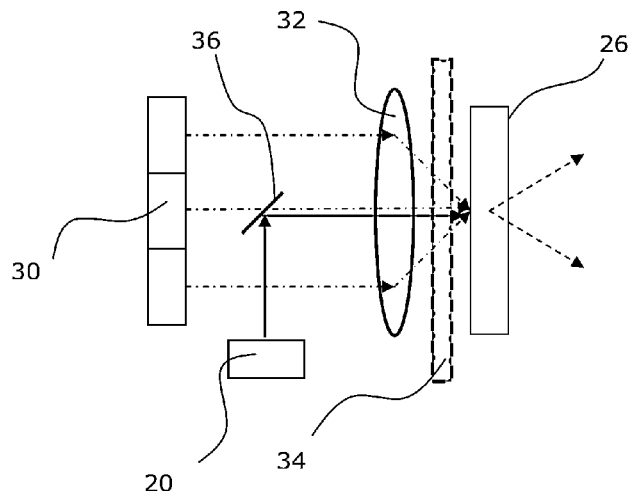
FIG. 3 shows a solid state light source device according to conventional art, which combines two excitation light sources to enhance brightness.
Figure 4:
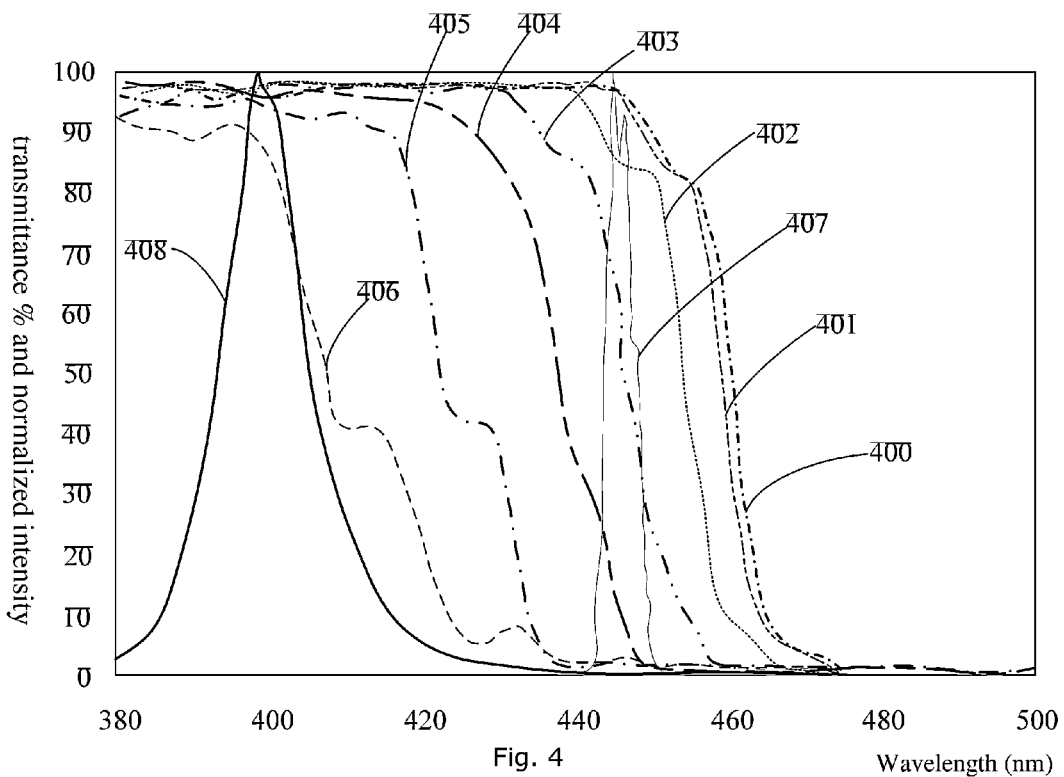
FIG. 4 illustrates the transmittance characteristics of a filter used in a light source device according to embodiments of the present invention, and the spectra of a blue laser source and a blue-violet LED source.

In various embodiments of the present invention, the primary and secondary excitation light sources have slightly different emission wavelengths. In some embodiments, the primary excitation source, which has a narrower beam size, has a longer wavelength than the secondary excitation source, which has a wider beam size. In some embodiments, the primary and secondary excitation sources are blue laser and blue-violet LEDs, respectively. FIG. 4 illustrates the transmission characteristics of a filter useful in some embodiments of the present invention, showing its transmittance curves at various incident angles (input angles), as well as the emission spectra of blue laser source and blue-violet LED source. The filter is a low-pass filter that generally transmits shorter wavelength light and reflects longer wavelength light, but its transmittance curve changes with the input angle. Generally, the transition wavelength (where the transmittance is 50%) moves to the shorter wavelength direction when the input angle increases. In FIG. 4, lines labeled 400 to 406 are the transmittance curves at input angle of 0, 10, 20, 30, 40, 50, and 60 degrees, respectively. Line 407 shows a blue laser spectrum and line 408 shows a blue-violet LED spectrum. It can be seen from FIG. 4 that at input angles from 0 to 20 degrees, the light of blue laser 407 can pass almost fully through the filter, and at input angles from 40 to 60 degrees and higher, the light of blue laser 407 will be substantially reflected by the filter. The light of the blue-violet LED 408 will substantially pass through the filter at input angles from 0 to 60 degrees, which corresponds to a large portion of a full hemisphere.

Figure 5:
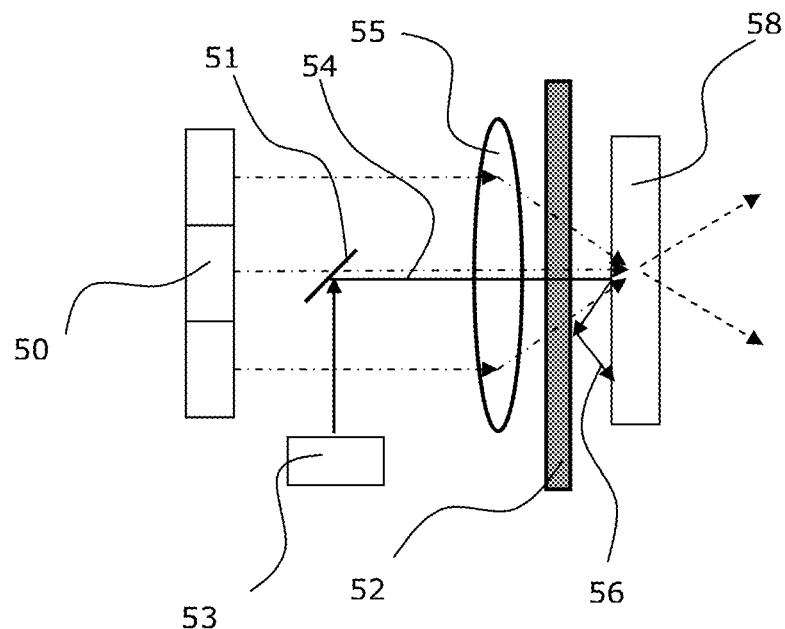
FIG. 5 illustrates the optical structure of a solid state light source device according to a first embodiment of the present invention.

FIG. 5 illustrates a solid state light source device according to a first embodiment of the present invention, which uses the filter shown in FIG. 4. The light source device includes a blue laser source 53, a blue-violet LED source 50, a coupler 51, a condenser optical system 55, a wavelength conversion device carrying wavelength conversion material 58, and a filter 52 such as one having the transmittance characteristics shown in FIG. 4. The light from the blue laser source 53 (the first or primary excitation light) and the light from the blue-violet LED source 50 (the second or secondary excitation light) are coupled into the same direction by the coupler 51, which may be a small mirror that reflects the light of the blue laser 53 to combine it with the light of the blue-violet LED 50. The blue-violet LED 50 may be an LED array having, e.g., three LEDs as shown in FIG. 5. The condenser optical system 55 is used to focus both the light of the blue laser 53 and the light of the blue-violet LED 50 on to the wavelength conversion material 58, which is excited to emit a luminescent light.

It can be seen from FIG. 5 that at least a portion of the second excitation light from the LED source 50 is located farther away from the optical axis of the condenser optical system 55 than the first excitation light from the laser source 53. Thus, after being focuses by the condenser optical system 55, the second excitation light is incident on the filter 52 with a larger angular range than the first excitation light. The condenser optical system 55 can reduce the etendue of the second excitation light. The condenser optical system 55 may be a lens, a lens array, or other suitable optical components.

When a small mirror is used as the coupler 51, only a small portion of the second excitation light from the blue-violet LED 50 is blocked by the mirror. The coupler 51 may also be a dichroic filter, which reflects the light from the blue laser 53 and transmits the light from the blue-violet LED 50. Other suitable devices may be used as the coupler 51, and the present invention is not limited to the specific examines described here. Regardless of the specific structure of the coupler 51, the light from the blue laser 53 (after reflection) and the light from the blue-violet LED 50 together are inputted to the condenser optics 55.

The peak wavelength of the light emitted from blue-violet LED source 50 (second excitation light) may range from 300 nm to 450 nm; preferably, the peak wavelength is from 360 nm to 420 nm. The peak wavelength of the blue laser light emitted from blue laser source 53 (first excitation light) may range from 400 nm to 500 nm. The primary excitation light, the laser emission in this example, should have longer wavelengths than the secondary excitation, the blue-violet LEDs in this example. Alternatively, the two excitation light sources can both be lasers, or both be LEDs, or they can be other suitable solid-state light sources. Also, both excitation lights may be UV lights; for example, their wavelengths may be 385 and 405, respectively.

The condenser optical system 55 focuses the secondary excitation light from the source 50 within a large angular range, from 0 degree to a predetermined angle, on to the wavelength conversion material 58. Preferably, the predetermined angle is from 60 degrees to 80 degrees. Alternatively, the predetermined angle may be from 30 degrees to 60 degrees.

In FIG. 5, the light from the blue laser source 53 is depicted as a line 54. By using the condenser optical system 55 and the coupler 51, the first excitation light from the blue laser source 53 inputted to the filter 52 in a direction substantially perpendicular to the filter 52 with relatively small divergence angles. The divergence angle is generally smaller than 45 degrees, preferably smaller than 20 degrees. Such blue light with small input angles passes through the filter 52 (refer to FIG. 4 and related descriptions above), and illuminates the wavelength conversion material 58. Some of the first excitation light is reflected back to the filter 52 by the wavelength conversion material 58 with a Lambertian distribution. A large portion of the reflected first excitation light 56, e.g. the portion with input angles greater than 40 degrees, is reflected by the filter 52 back to the wavelength conversion material 58, where it is absorbed to generate more luminescent light.

The filter 52 has transmittance characteristics shown in FIG. 4. It substantially transmits the first excitation light (blue in this example) at input angles smaller than a first threshold angle and substantially reflects the first excitation light at input angles greater than a second threshold angle; and substantially transmits the second excitation light (blue-violet in this example) at input angles smaller than a third threshold angle. The third and second threshold angles are greater than the first threshold angle. In the example shown in FIG. 4, the first threshold angle is about 20 degrees, the second threshold angle is about 40 degrees, and the third threshold angle is about 60 degrees. More generally, in a preferred embodiment, the first threshold angle may be between 0 and 40 degrees, and the second threshold angle may be between 10 and 60 degrees. In another preferred embodiment, the first threshold angle may be between 0 and 20 degrees, and the second threshold angle may be between 10 and 30 degrees. Further, the third threshold angle should be as large as possible (while meeting the above-described conditions), so that the second excitation light illuminating on the filter 52 at high angles can be transmitted as much as possible.

It should be noted that although examples of transmittance curves are shown in FIG. 4, a filter that can be used as the filter 52 is not limited to having the specific transmission characteristics shown in FIG. 4. The first, second and third threshold angles may have other values. More generally, the color of the first and second excitation lights, the filter 52 and the condenser optical system 55 are chosen such that the first excitation light, after being focused by the condenser optical system 55, has input angles on the filter 52 less than the first threshold angle, and passes through the filter 52; and the second excitation light, after being focused by the condenser optical system 55, has input angles on the filter 52 less than the third threshold angle and greater than (at least for a part of the light second excitation) the first threshold angle.

Such a filter allows the second excitation light from the blue-violet LED source 50 with a large input angle range to pass through it and illuminate the wavelength conversion material; at the same time, the filter 52 allows the first excitation light from the blue laser source 53 to pass through it and allows the reflected first excitation light 56 from the wavelength conversion material 58 to be partially recycled to enhance the luminescent light.

The filter 52 may be dichroic filters, which may be formed by coating a transparent medium with alternating films having different refractive indices. The interference of light between the various films results in different transmittance or reflectance of light in different wavelength ranges.

To summarize, in the first embodiment, a shorter wavelength second excitation light (from LED 50) is used to supplement the first excitation light (from laser 53), and the filter 52 is used to transmit the first excitation light which has relatively small input angles and transmit the second excitation light which has relatively large input angles. Further, the filter 52 reflects the first excitation light that has been reflected by the wavelength conversion material 58 toward the filter at larger input angles, so that a majority of the reflected first excitation light can be recycled, thereby enhancing the light output efficiency of the light source device.

Because the converted light generated by the wavelength conversion material 58 is generally isotropic, a part of the converted light travels toward the filter 52. Thus, preferably, the filter 52 also reflects the converted light generated by the wavelength conversion material 58, so that the converted light that travels from the wavelength conversion material toward the filter is reflected by the filter back to the wavelength conversion material. This further enhances the light output efficiency of the light source device.

Figure 6:
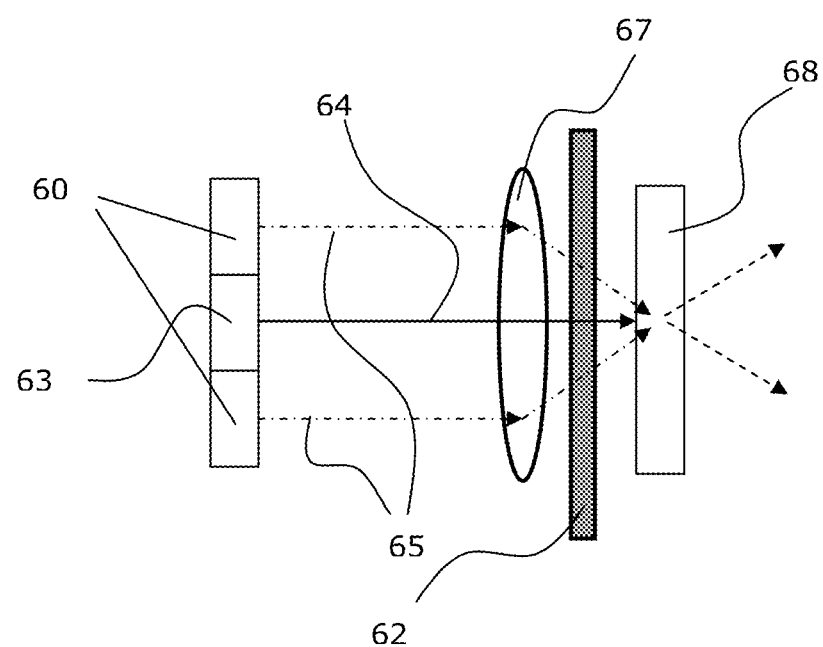
FIG. 6 illustrates the optical structure of a solid state light source device according to a second embodiment of the present invention.

In a second embodiment, shown in FIG. 6, the two excitation light sources are coupled in a different manner than in the first embodiment. In the second embodiment, the blue-violet LED sources 60 and the blue laser source 63 are mixed in an array; the blue laser source 63 is located in the center portion of the array, while the blue-violet LED sources are located around the blue laser source 63. The coupler 51 is omitted, and the rest of the structure is similar or identical to that of the first embodiment (FIG. 5).

Through the condenser optical system 67, the second excitation light 65 from the blue-violet LED source 60 is focused on the wavelength conversion material having a relatively large angular range with respect to the normal direction of the filter 62, from a predetermined smaller angle A to a predetermined large angle B. Preferably, A is from 15 to 30 degrees, and B is from 60 to 80 degrees. Alternatively, A may be from 2 to 15 degrees and B may be from 30 to 60 degrees.

Through the condenser optical system 67, the first excitation light 64 from the blue laser source 63 is focused on the filter 62 with a relatively small angular range with respect to the normal direction of the filter, e.g., smaller than 45 degrees, and preferably smaller than 20 degrees.

It can be seen from FIG. 6 that the second excitation light 65 from the LED source 60 is located farther away from the optical axis of the condenser optical system 67 than the first excitation light 64 from the laser source 63. The condenser optical system 67, filter 62 and wavelength conversion material 68 function in similar ways as the corresponding condenser optical system 55, filter 52 and wavelength conversion material 58 in FIG. 5. As a result, the first excitation light reflected by the wavelength conversion material 68 is partially recycled by the filter 62. More detailed explanations are omitted here.

Figure 7:
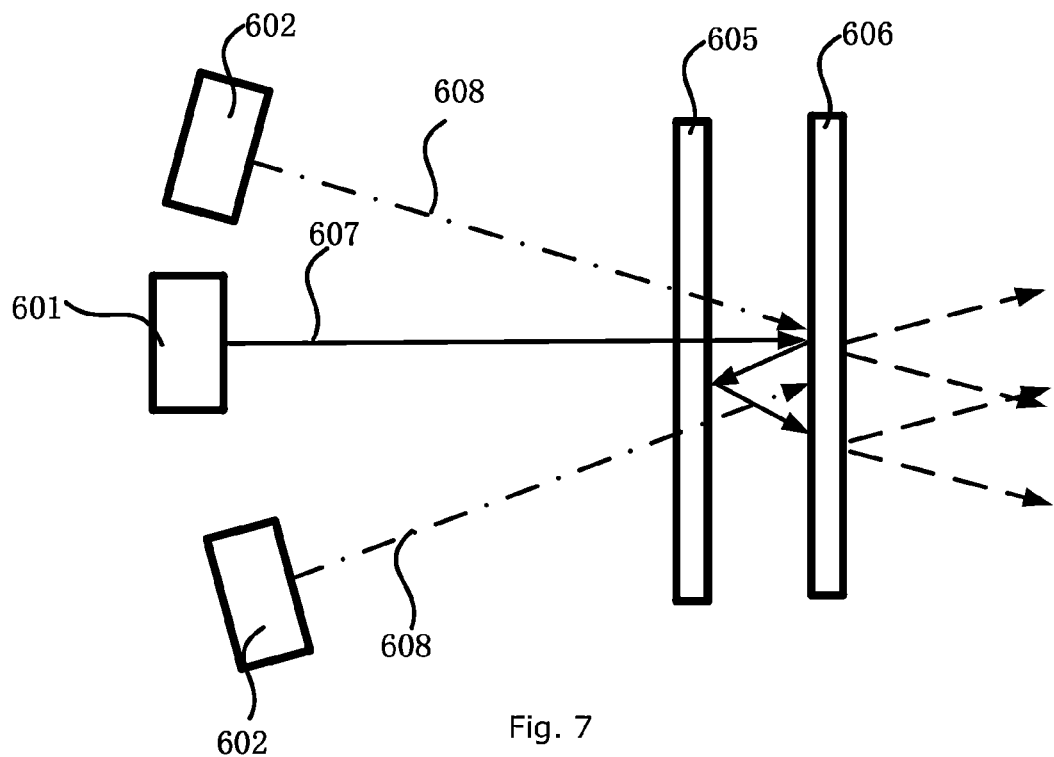
FIG. 7 illustrates the optical structure of a solid state light source device according to a third embodiment of the present invention.
Figure 8:
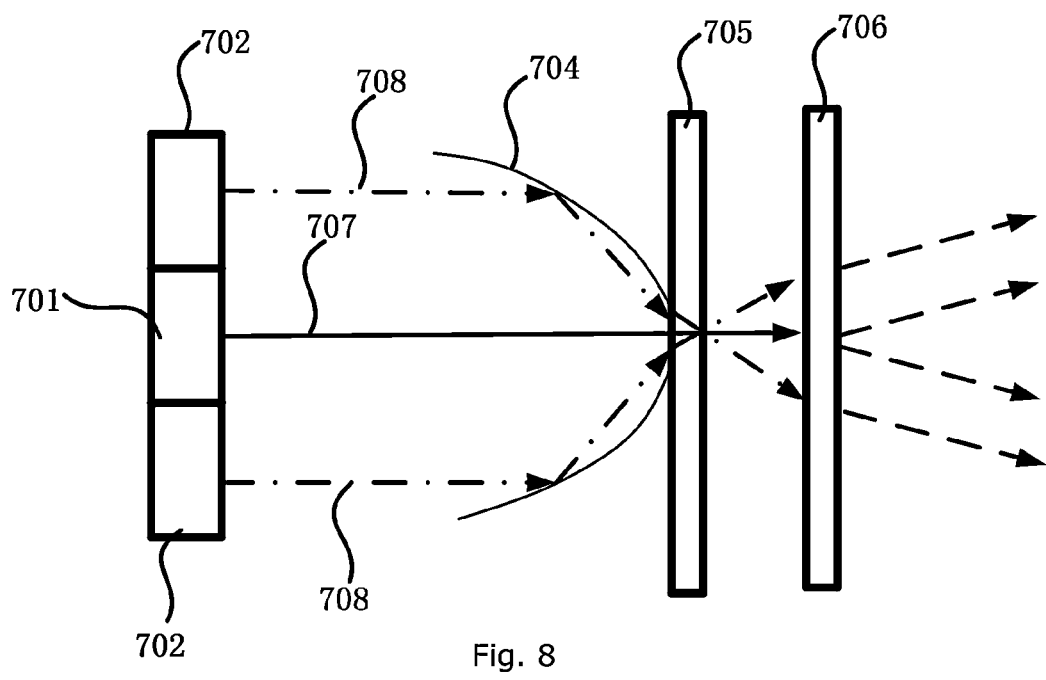
FIG. 8 illustrates the optical structure of a solid state light source device according to a fourth embodiment of the present invention.

Other configuration can be used based on the same principles described above, i.e., different excitation lights of different colors are incident on the filter at different angles or angular ranges. FIGS. 7 and 8 illustrate two examples.

FIG. 7 illustrates a solid state light source device according to a third embodiment of the present invention. The light source device includes a first excitation light source 601, a second excitation light source 602, a filter 605 such as one having the transmittance characteristics shown in FIG. 4, and a wavelength conversion device carrying wavelength conversion material 606. The first excitation light source 601 is disposed in an orientation such that its light (the first excitation light) generally travels in a direction perpendicular to the filter 605. The second excitation light sources 602 are disposed in orientations such that their light (the second excitation light) generally travel in directions at an angle with respect to the normal direction of the filter 605. Although two second excitation light sources are depicted in FIG. 7, one can be used, or three or more can be used. A difference between the third embodiment (FIG. 7) and the first and second embodiments (FIGS. 5, 6) is that, no condenser optical device is used in the third embodiment. Because of the orientations of the excitation light sources described above, the first and second excitation lights are input to the filter 605 at different angles even without a condenser optical device. Preferably, the first and second excitation light sources have relatively small etendue. The filter 605 and wavelength conversion material 606 function in similar ways as the corresponding filter 52 and wavelength conversion material 58 in FIG. 5. As a result, the first excitation light reflected by the wavelength conversion material 606 is partially recycled by the filter 605. More detailed explanations are omitted here.

FIG. 8 illustrates a solid state light source device according to a fourth embodiment of the present invention. The light source device includes a first excitation light source 701, a second excitation light source 702, a reflector 704, a filter 705 such as one having the transmittance characteristics shown in FIG. 4, and a wavelength conversion device carrying wavelength conversion material 706. Similar to the second embodiment (FIG. 6), the first source 701 and the second source 702 are mixed in an array, with the first source located in the center and the second sources located around the first source. A difference between the fourth embodiment (FIG. 8) and the second embodiment (FIG. 6) is that the condenser optical system 67 of FIG. 6 is replaced by the reflector 704 of FIG. 8. The reflector 704 has a concave shaped reflecting surface facing the first and second light sources, with a small opening in the center. For example, the reflector may be a CPC (compound parabolic concentrator). The light 707 from the first excitation light source 701 passes through the opening of the reflector directly without reflection to illuminate on the filter 705. The light 708 from the second excitation light source 702 is reflected by the reflector 704 and then passes through the opening of the reflector directly to illuminate on the filter 705. Thus, the light from the first excitation source reaches the filter 705 at relatively small input angles, while the light from the second excitation source reaches the filter 705 at relatively large input angles. The filter 705 and wavelength conversion material 706 function in similar ways as the corresponding filter 52 and wavelength conversion material 58 in FIG. 5. As a result, the first excitation light reflected by the wavelength conversion material 706 is partially recycled by the filter 705. More detailed explanations are omitted here.

The condenser optical system 55, 67 and the reflector 704 may generally be referred to as a light collection system.

Figure 9:
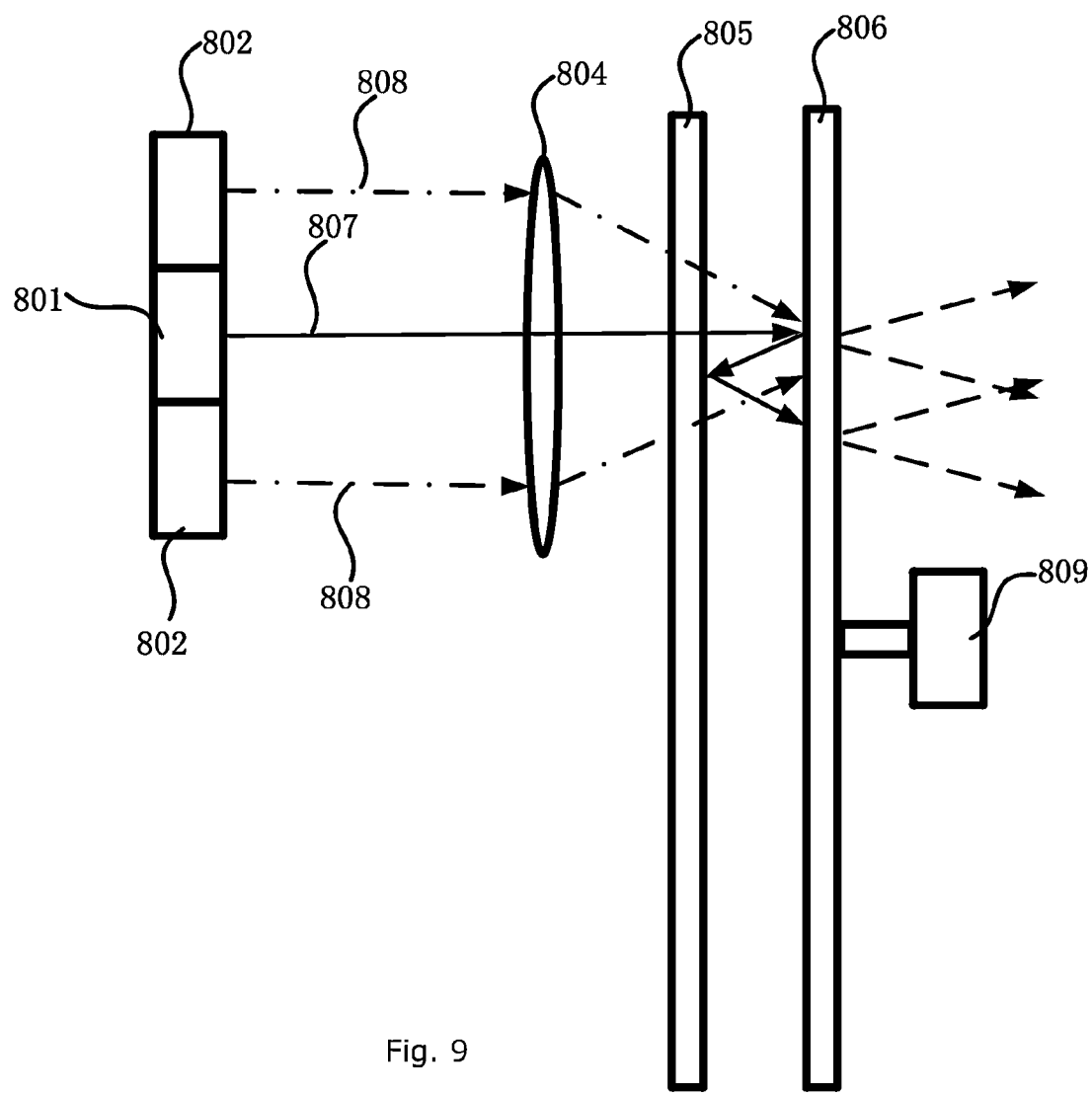
FIG. 9 illustrates the optical structure of a solid state light source device according to a fifth embodiment of the present invention.

The various light source devices described above may be used in a structure that incorporates a moving wheel device, as shown in FIG. 9. FIG. 9 illustrates a solid state light source device according to a fifth embodiment of the present invention, which includes a first excitation light source 801, a second excitation light source 802, a condenser optical system 804, a filter 805 such as one having the transmittance characteristics shown in FIG. 4, and a wavelength conversion device carrying wavelength conversion material 806. The first and second light sources 801, 802 and the condenser optical system 804 are similar or identical to the corresponding components 63, 60, and 67 in the second embodiment (FIG. 6). A difference between the fifth embodiment (FIG. 9) and the second embodiment (FIG. 6) is that the wavelength conversion material 806 is carried on a rotating wheel device. The rotating wheel device includes a drive mechanism 809 to rotate the wheel that carries the wavelength conversion material 806. As the wheel rotates, different segments of the wavelength conversion material 806 are illuminated by the first and second excitation lights that pass through the filter 805. This can prevent any given area of the wavelength conversion material from being exposed by the excitation lights for a prolonged time, thereby avoiding overheating of the wavelength conversion material. Further, different kinds of wavelength conversion materials may be carried on different segments of the wheel, generating different colored converted lights as the wheel rotates. In an alternative embodiment, the filter 805 can be fixedly mounted relative to the wavelength conversion material(s) 806, and rotates with the wavelength conversion material(s) 806 by the drive mechanism 809. The light sources 801, 802 and the condensing optics 804 can be replaced by the corresponding components shown in FIGS. 5, 7 and 8.

Figure 10:
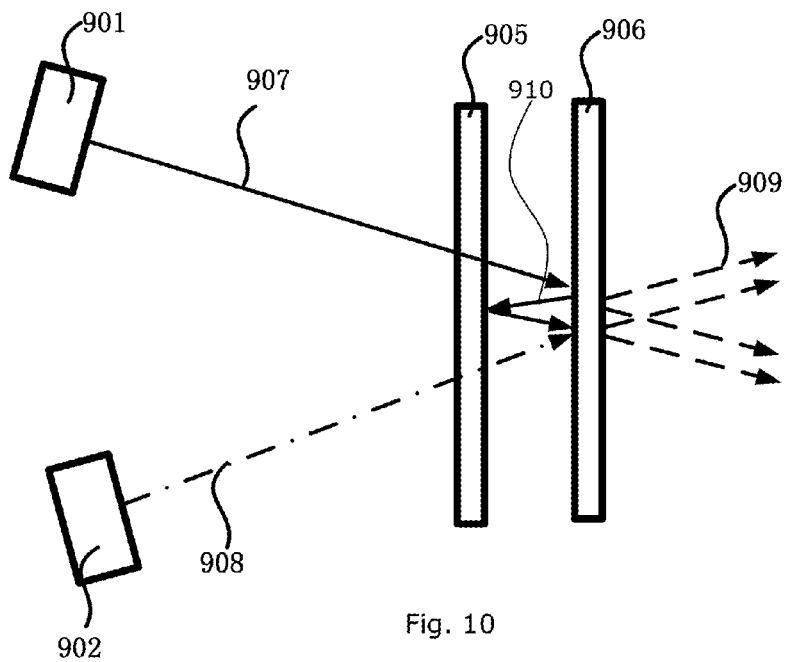
FIG. 10 illustrates the optical structure of a solid state light source device according to a sixth embodiment of the present invention.

FIG. 10 illustrates a solid state light source device according to a sixth embodiment of the present invention. This light source device includes a first excitation light source 901, a second excitation light source 902, a filter 905, and a wavelength conversion device carrying wavelength conversion material 906. Unlike in the first to fifth embodiments, the peak wavelength of the second excitation light 908 generated by the second excitation light source 902 is longer than the peak wavelength of the first excitation light 907 generated by the first excitation light source 901. The filter 905 has transmittance characteristics shown in FIG. 11.

Figure 11:
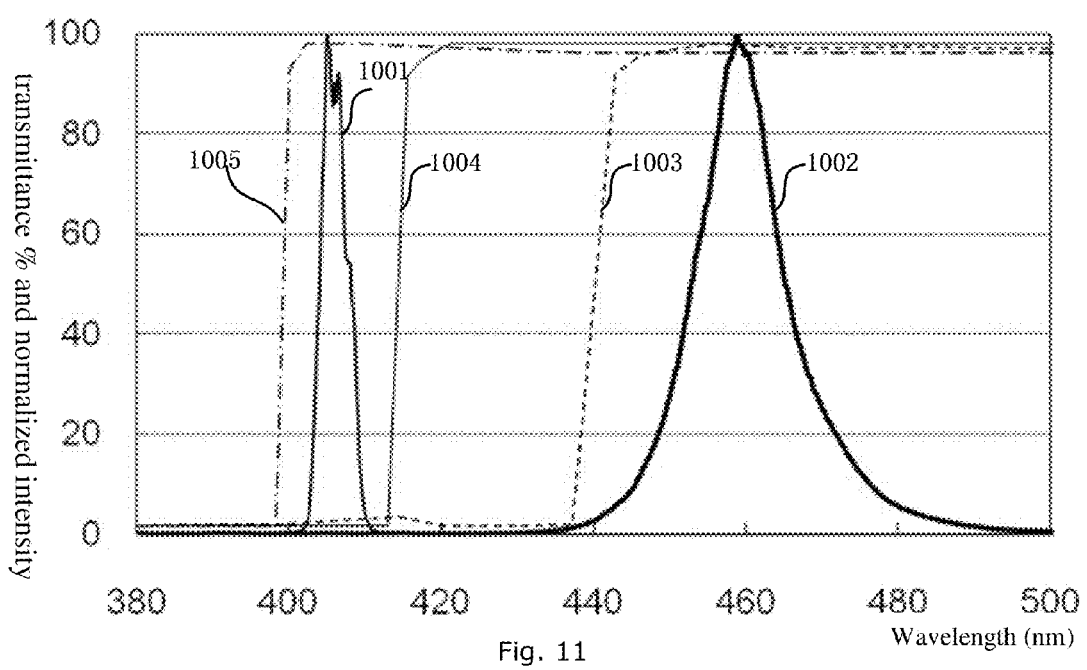
FIG. 11 illustrates the transmittance characteristics of a filter used in the light source device of FIG. 10, and spectra of a laser source and a LED source.

The filter 905 is a high-pass filter whose transmittance curves are dependent on the input angle. In other words, it generally transmits longer wavelength light and reflects shorter wavelength light, but its transmittance curve changes with the input angle. The transition wavelength (where the transmittance is 50%) moves to the shorter wavelength direction when the input angle increases. The filter 905 substantially reflects the first excitation light 907 at input angles smaller than a first threshold angle and substantially transmits the first excitation light 907 at input angles greater than a second threshold angle, and substantially transmits the second excitation light 908 at input angles greater than a third threshold angle. The second threshold angle is greater than the first threshold angle. In FIG. 11, the lines 1001 and 1002 represent the spectra of the first and second excitation lights 907 and 908, respectively; the lines 1003, 1004 and 1005 represent the transmittance curve of the filter 905 at input angles 10, 40 and 60 degrees, respectively. In this example, for the first excitation light 907 (line 1001), when the input angle is smaller than 40 degrees (line 1004), the filter 905 substantially reflects the first excitation light, and when the input angle is greater than 60 degrees (line 1005), the filter 905 substantially reflects the first excitation light. For the second excitation light 908 (line 1002), the filter 905 substantially transmits it at almost all angles (in this embodiment the third threshold angle is 0 degree).

Referring back to FIG. 10, the first excitation light 907 generated by the first excitation light source 901 is inputted to the filter 905 at input angles greater than the second threshold angle of the filter and passes through the filter. The second excitation light 908 generated by the second excitation light source 902 is inputted to the filter 905 at input angles greater than the third threshold angle of the filter and passes through the filter. The wavelength conversion material 906 converts a part of the first and second excitation lights that pass through the filter 905 into converted light 909, and reflects another part of the first and second excitation lights back to the filter 905. Of the first excitation light that has been reflected by the wavelength material 906 to the filter 905, some of it (e.g. 910) has input angles smaller than the first threshold angle and is reflected by the filter 905 back to the wavelength conversion material 906, where it is partially absorbed to the converted light. In this embodiment, the second excitation light 908 generated by the second excitation light source 902 may be inputted to the filter 905 at any angle greater than the third threshold angle.

In the structure of FIG. 10, by using a longer wavelength second excitation light 908 to supplement the first excitation light 907, and using the filter 905 to transmit the first excitation light 907 from the first excitation light source 901 at relatively large input angles and to reflect the first excitation light 910 from the wavelength conversion material 906 at relatively small input angles, a large portion of the first excitation light can be recycled, thereby enhancing the light out efficiency of the light source device.

Preferably, the filter 905 also reflects the converted light generated by the wavelength conversion material 906, so that the converted light that travels from the wavelength conversion material toward the filter is reflected by the filter back to the wavelength conversion material.

The filter 905, with transmission characteristics shown in FIG. 11, can be used to replace the filter 52, 62, 605, 705 and 805 in the first through fifth embodiments. If such a filter is used, the first excitation light in these embodiments should have input angles on the filter 905 greater than the second the second threshold angle of the filter 905, in order to accomplish the recycling of the first excitation light.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A light source device comprising:
   a first excitation light source generating a first excitation light;
   a second excitation light source generating a second excitation light, wherein a peak wavelength of the second excitation light is shorter than a peak wavelength of the first excitation light;
   a filter, which substantially transmits the first excitation light at input angles smaller than a first threshold angle and substantially reflects the first excitation light at input angles greater than a second threshold angle, and which substantially transmits the second excitation light at input angles smaller than a third threshold angle, wherein the third and second threshold angles are greater than the first threshold angle;
   wherein the first excitation light source is arranged to input the first excitation light onto the filter at input angles smaller than the first threshold angle and passes through the filter, and the second excitation light source is arranged to input the second excitation light onto the filter at input angles smaller than a third threshold angle and at least partially greater than the first threshold angle and passes through the filter; and a wavelength conversion device carrying a wavelength conversion material, disposed to receive the first and second excitation lights that have passed through the filter, the wavelength conversion material converting a part of the first and second excitation lights into a converted light and reflecting another part of the first and second excitation lights toward the filter; and wherein the filter reflects a part of the first excitation light that has been reflected from the wavelength conversion material, and which reaches the filter at input angles greater than the second threshold angle, back toward the wavelength conversion material.

2. The light source device of claim 1, wherein the filter further reflects the converted light from the wavelength conversion material back to the wavelength conversion material.

3. The light source device of claim 1, wherein the first excitation light is a blue light and the second excitation light is a UV light.

4. The light source device of claim 1, wherein the first excitation light is a blue light and the second excitation light is a blue-violet light.

5. The light source device of claim 1, wherein the first excitation light source is a laser device and the second excitation light source is a light-emitting diode (LED).

6. The light source device of claim 1, wherein the first threshold angle is between 0 and 40 degrees, and the second threshold angle is between 10 and 60 degrees.

7. The light source device of claim 6, wherein the first threshold angle is between 0 and 20 degrees, and the second threshold angle is between 10 and 30 degrees.

8. The light source device of claim 1, further comprising a light collection device for collecting the first and second excitation lights for illuminating on the filter.

9. The light source device of claim 8, wherein the light collection device includes a lens, and wherein at least a portion of the second excitation light is located farther away from an optical axis of the lens than the first excitation light.

10. The light source device of claim 9, wherein the first and second excitation light sources are arranged in an array, wherein the second excitation light source is located farther away from an optical axis of the lens than the first excitation light source.

11. The light source device of claim 8, further comprising a reflector for reflecting the first excitation light from the first excitation light source to the light collection device.

12. The light source device of claim 11, wherein the reflector is a dichroic filter that reflects the first excitation light and transmits the second excitation light.

13. The light source device of claim 8, wherein the light collection device includes a reflector having a concave reflecting surface with an opening located at a center of the reflector, wherein the first excitation light passes through the opening directly to illuminate the filter and the second excitation light is reflected by the reflector and then passes through the opening to illuminate the filter.

14. The light source device of claim 1, further comprising a drive mechanism for driving the wavelength conversion device to move, wherein the first and second excitation lights illuminate different portions of the wavelength conversion material as the wavelength conversion device moves.

15. The light source device of claim 14, wherein the filter is fixedly mounted relative to the wavelength conversion material and rotates with the wavelength conversion material by the drive mechanism.

16. A light source device comprising:

a first excitation light source generating a first excitation light;

a second excitation light source generating a second excitation light, wherein a peak wavelength of the second excitation light is longer than a peak wavelength of the first excitation light;

a filter, which substantially reflects the first excitation light at input angles smaller than a first threshold angle and substantially transmits the first excitation light at input angles greater than a second threshold angle, and which substantially transmits the second excitation light at input angles smaller than a third threshold angle, wherein the second threshold angle is greater than the first threshold angle;

wherein the first excitation light source is arranged to input the first excitation light onto the filter at input angles greater than the second threshold angle and passes through the filter, and the second excitation light source is arranged to input the second excitation light onto the filter at input angles smaller than a third threshold angle and at least partially greater than the first threshold angle and passes through the filter; and a wavelength conversion device carrying a wavelength conversion material, disposed to receive the first and second excitation lights that have passed through the filter, the wavelength conversion material converting a part of the first and second excitation lights into a converted light and reflecting another part of the first and second excitation lights toward the filter; and wherein the filter reflects a part of the first excitation light that has been reflected from the wavelength conversion material, and which reaches the filter at input angles smaller than the first threshold angle, back toward the wavelength conversion material.

17. A light source device comprising:

a first excitation light source generating a first excitation light;

a second excitation light source generating a second excitation light, wherein a peak wavelength of the second excitation light is different from a peak wavelength of the first excitation light;

a filter having transmittance characteristics that vary with an input angle of input light inputted on the filter, the filter being a low-pass or high-pass filter whose transition wavelengths vary with the input angles;

wherein the first and second excitation light sources are arranged to input the first and second excitation lights onto the filter at different input angles, and wherein the filter substantially transmits each of the first and second excitation light; and a wavelength conversion device carrying a wavelength conversion material, disposed to receive the first and second excitation lights that have been transmitted through the filter, the wavelength conversion material converting a part of the first and second excitation lights into a converted light and reflecting another part of the first and second excitation lights toward the filter; and wherein the filter reflects a part of either the first or the second excitation light that has been reflected from the wavelength conversion material back toward the wavelength conversion material.

18. The light source device of claim 17, wherein the filter further reflects the converted light from the wavelength conversion material back to the wavelength conversion material.

19. The light source device of claim 17, wherein the first excitation light is a blue light and the second excitation light is a UV or blue-violet light.

20. The light source device of claim 17, wherein the first excitation light source is a laser device and the second excitation light source is a light-emitting diode (LED).

* * * * *